(12) United States Patent
Bozarth et al.

(10) Patent No.: US 9,530,381 B1
(45) Date of Patent: Dec. 27, 2016

(54) DISPLAY WITH LIGHT SENSOR FEEDBACK

(71) Applicant: Amazon Technologies, Inc., Reno, NV (US)

(72) Inventors: Bradley James Bozarth, Sunnyvale, CA (US); Ilya Daniel Rosenberg, Mountain View, CA (US); Thomas Bruno Mader, Los Gatos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 324 days.

(21) Appl. No.: 13/722,245

(22) Filed: Dec. 20, 2012

(51) Int. Cl.
*G09G 5/10* (2006.01)
*H05B 37/02* (2006.01)

(52) U.S. Cl.
CPC .............. *G09G 5/10* (2013.01); *H05B 37/02* (2013.01)

(58) Field of Classification Search
CPC ................................. G09G 5/10; H05B 37/02
USPC ......................................................... 345/690
See application file for complete search history.

(56) References Cited

U.S. PATENT DOCUMENTS

| | | | |
|---|---|---|---|
| 2005/0073495 A1* | 4/2005 | Harbers | G02F 1/133603 345/102 |
| 2005/0219272 A1* | 10/2005 | Johnson et al. | 345/690 |
| 2008/0136336 A1* | 6/2008 | Kalnitsky | H05B 33/0854 315/158 |
| 2008/0198143 A1* | 8/2008 | Kinoshita et al. | 345/175 |
| 2008/0284720 A1* | 11/2008 | Fukutome | G02F 1/13454 345/102 |
| 2010/0177078 A1* | 7/2010 | Lowles | G09G 3/3406 345/207 |
| 2011/0032227 A1* | 2/2011 | Miyaguchi | 345/207 |

* cited by examiner

*Primary Examiner* — Jonathan Boyd
(74) *Attorney, Agent, or Firm* — Lee & Hayes, PLLC

(57) ABSTRACT

In some examples, a display includes a plurality of pixels and a plurality of light sensors. As one example, a respective light sensor may be associated with each pixel. The light sensor output can provide an accurate indication of a current optical state of each of the plurality of pixels. For instance, output from a light sensor proximate to a particular pixel may be used when determining a pixel control signal to be applied for updating the particular pixel to a next optical state. The light sensors may be located below, above, laterally adjacent to, or within one or more pixel elements of each pixel. Additionally, in some examples, one or more light sources may be provided to normalize the output from the light sensors to compensate for variations in ambient lighting and the like.

20 Claims, 10 Drawing Sheets

DISPLAY WITH LIGHT SENSOR FEEDBACK

BACKGROUND

Electronic displays are found in numerous types of electronic devices such as electronic book ("eBook") readers, cellular telephones, portable media players, tablet computers, laptop computers, netbooks, desktop computers, televisions, appliances, home electronics, automotive electronics, augmented reality devices, and so forth. Electronic displays may present various types of information, such as user interfaces, device operational status, digital content items, etc., depending on the kind and purpose of the associated device. However, displays may be limited in functionality or may be otherwise constrained due to technology choices. This may result in varying responsiveness to user inputs, inaccurate color reproduction, and the use of certain types of workarounds, frequent screen refresh actions, or the like, which can detract from a user's experience with a display.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
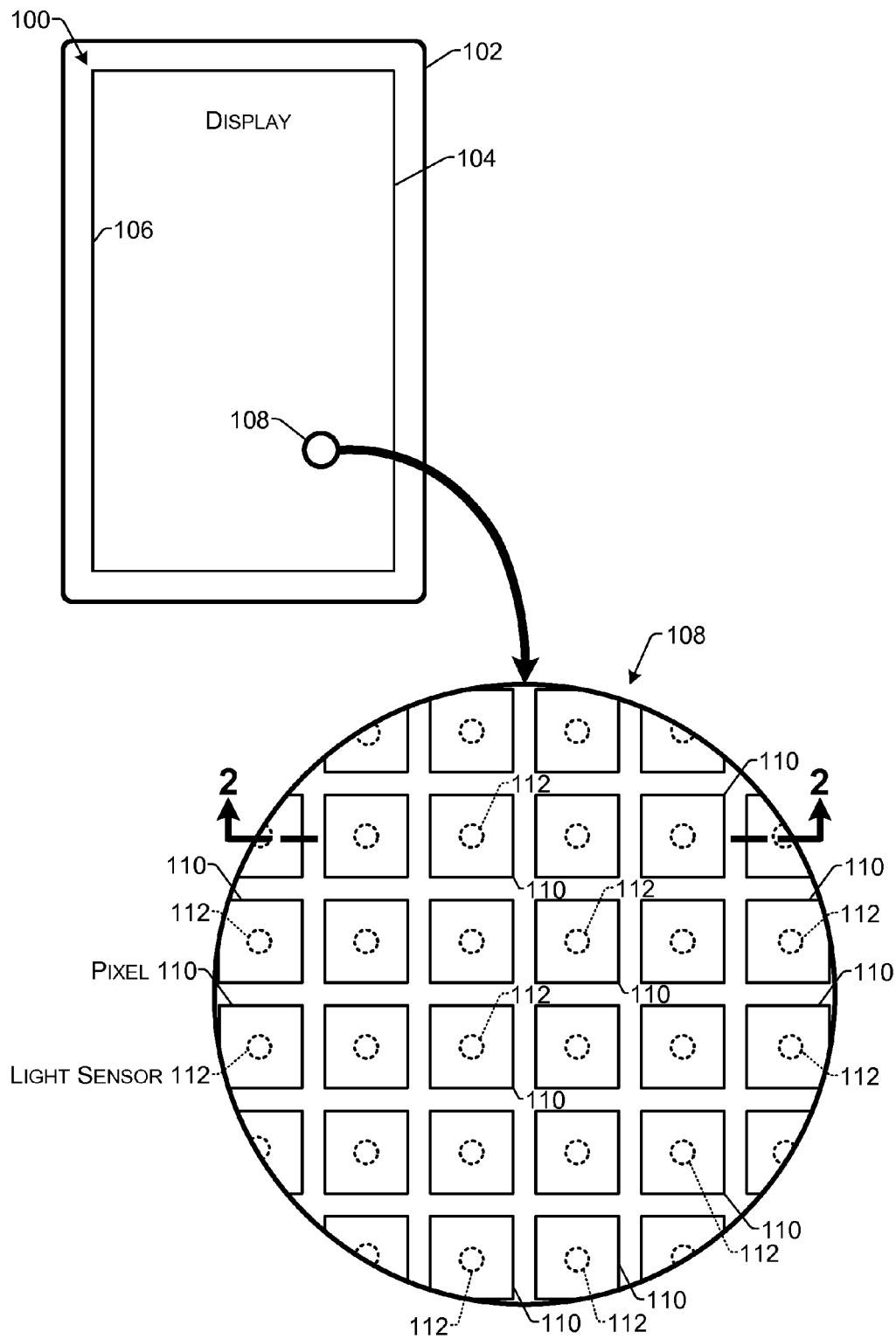
FIG. 1 illustrates an example display with a plurality of pixels and a plurality of light sensors associated with the plurality of pixels according to some implementations.

Some implementations herein include a display and/or techniques for operating and controlling the display. For instance, the display may include a plurality of pixels and a plurality of light sensors. As one example, a light sensor may be associated with each pixel of the plurality of pixels. In some situations, a respective light sensor associated with each pixel may provide an indication of the actual appearance, color or other optical state of the corresponding pixel. This sensor information may be used to control a signal applied to the pixel for controlling the optical state of the pixel. Accordingly, based at least in part on the sensed optical state of each pixel, the entire image presented on the display may be presented more accurately.

In some examples, the optical state of a pixel may include at least one optical property such as a shade or color of the pixel, which may be perceptible to the human eye. Other examples of optical properties indicative of an optical state may include optical transmission, reflectance or luminescence of a pixel. Further in some examples the determination of an optical state may include a measurement of electromagnetic wavelengths reflected by or emitted by a pixel, such as may be detected by a light sensor, even if not detectable by the human eye. In addition, in some examples herein, "colors" may include black, white, varying shades of gray, and/or other monotone variations in addition to, or as an alternative to, the colors of the visible spectrum, such as red, yellow, blue and combinations thereof.

Some implementations herein may be employed for controlling a bi-stable display, such as an electronic paper (ePaper) display. In some cases, the pixels in bi-stable displays may accumulate incremental inaccuracies over time. Thus, by associating a light sensor with each pixel of the display, such inaccuracies can be detected and addressed when updating one or more pixels to produce a next frame or next image on the display. For example, an image processing module may use the feedback from the light sensors to determine a suitable waveform to apply to each pixel to be updated for displaying the next image on the display.

Furthermore, in some examples, one or more light sources may be associated with the display. For instance, to address variations in ambient lighting, external shadows cast onto the display, and so forth, the one or more light sources may serve to normalize the output from the light sensors by providing a consistent light level across the plurality of pixels for determining values of light reflected from respective pixels. As an alternative, one more pixels may be maintained in a known state and used as a reference for normalizing the output of the light sensors. Normalizing the output of the light sensors may improve the accuracy and consistency of the sensor output and the usage thereof.

For discussion purposes, some example implementations are described in the environment of a display of an electronic device. However, the implementations herein are not limited to the particular examples provided, and may be extended to other types of displays, other types of light sensors, other types of devices and other types of applications, as will be apparent to those of skill in the art in light of the disclosure herein.

FIG. 1 illustrates an example display 100 according to some implementations herein. In some examples, the display 100 may be integrated with or incorporated into an electronic device 102. In other examples, the display 100 may be connected to the electronic device 102 through a cable, a wireless link, or the like. The display 100 may include a display screen or display panel 104 and a bezel 106 around a perimeter of the display panel 104. As illustrated in an enlarged area 108 of the display panel 104, the display 100 may include a plurality of pixels 110. For example, the pixels 110 may be arranged in a plurality of rows and columns underneath an outer surface of the display. The pixels 110 may be activated or operated independently of one another to present an image on the display 100. Furthermore, each pixel 110 may include one or more pixel elements. For example, in some types of monotone displays, a single pixel element may serve as each pixel 110. Alternatively, such as in the case of a color display, or in other types of monotone displays, multiple pixel elements may be included in each pixel 110. In some examples, the pixel element is the portion of the pixel that physically changes in response to a received pixel control signal to change the optical state of the pixel. Accordingly, a pixel element may be the smallest addressable portion of a pixel. Numerous different types of pixels and pixel elements having various different structures may be employed in the displays herein depending on the type and intended purpose of the display.

In some implementations, the display 100 uses electronic paper (ePaper) display technology, which is bi-stable and capable of maintaining text or other rendered images even when very little or no power is supplied to the display 100. Some examples of the display 100 that may be used with the implementations described herein include bi-stable LCD displays, micro electromechanical system (MEMS) displays, such as Mirasol® displays, cholesteric displays, pigmented electrophoretic displays, electrofluidic pixel displays, electrowetting displays, photonic ink displays, and others. In other implementations, or for other types of devices, the display 100 may be an active display such as a liquid crystal display, a plasma display, a light emitting diode display, an organic light emitting diode display, and so forth. Accordingly, implementations herein are not limited to any particular display technology.

In some examples, each pixel of the display 100 may include or may otherwise have associated therewith a light sensor 112. For instance, as illustrated in FIG. 1, the respective light sensor 112 for each pixel may be located below the associated pixel 110. In other examples, as discussed additionally below, the light sensor 112 may be positioned above the pixel 110, adjacent to the pixel 110, within the pixel 110, within a pixel element of the pixel 110, or at any other location that is suitable to be able to sense light associated with the corresponding pixel 110. Additionally, in other examples, a single light sensor 112 may be associated with more than one pixel 110, or multiple light sensors 112 may be associated with a single pixel 110. Further, in some examples, a first plurality of pixels 110 in the display 100 may have a respective light sensor associated with each pixel, while other pixels 110 in the display 100 may not have light sensors associated therewith, or may have a single light sensor dedicated to multiple pixels. Numerous other variations will be apparent to those of skill in the art having the benefit of the disclosure herein. Thus, implementations herein are not limited to a one-to-one relationship between pixels 110 and light sensors 112.

In some examples, each light sensor 112 may be a photo diode, and may be formed using suitable solid-state manufacturing techniques. In other examples, the light sensors 112 may be at least one of a charged coupled device, an electro-optical sensor, a phototransistor, a photoresistor, a photon counter, or any other suitable type of light sensor. Accordingly, implementations herein are not limited to any particular type of light sensor 112. Further, in some examples, the light sensors may be positioned to avoid interfering with the operation or appearance of the display. As another example, the light sensors may be manufactured to be at least partially transparent or translucent, such as in the case of the light sensors being located above a pixel element layer, being included in a reflective display, or the like.

Figure 2:
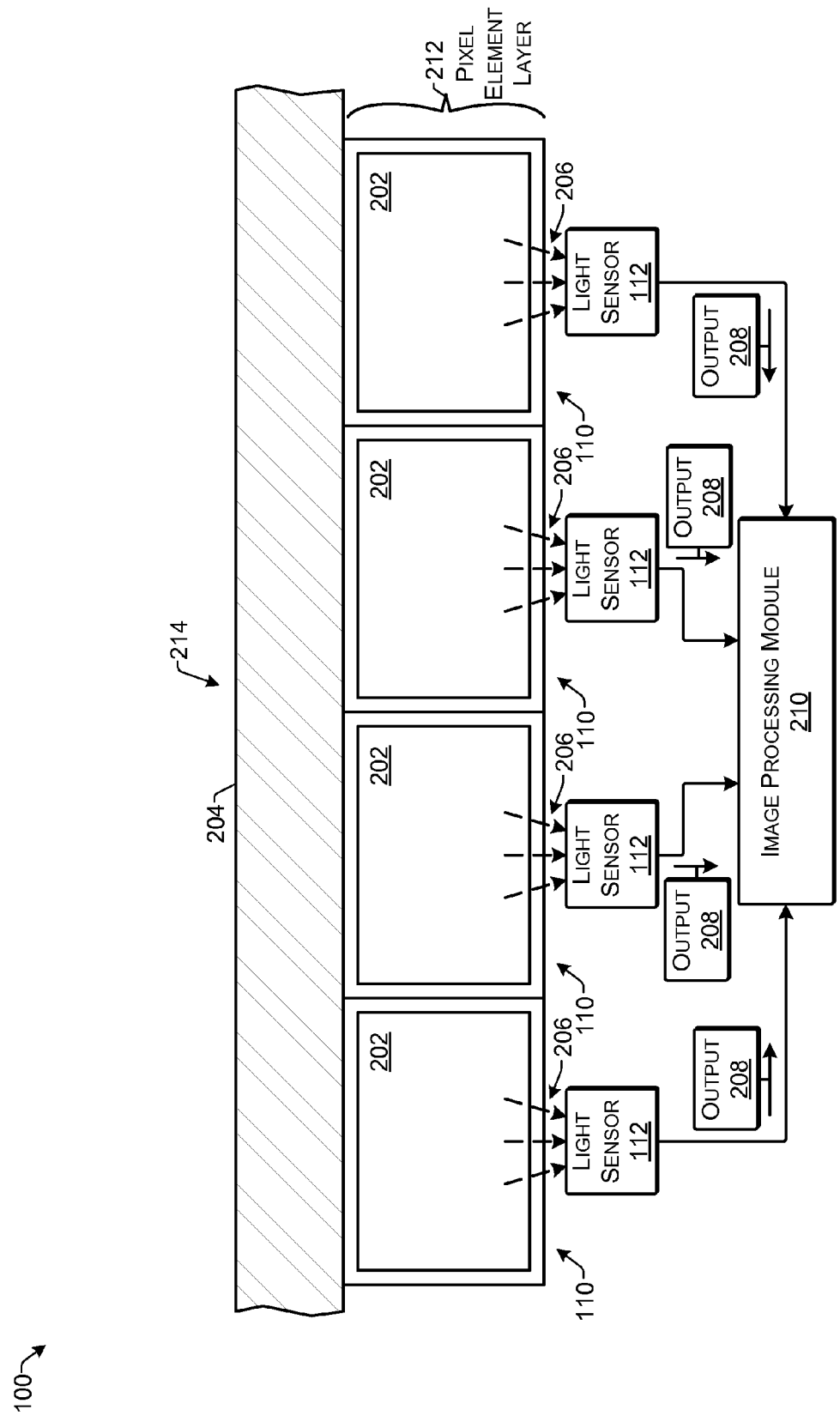
FIG. 2 illustrates an example cross section view of a plurality of pixels as taken along line 2-2 of FIG. 1 according to some implementations of the display.

FIG. 2 illustrates an example cross sectional view of a plurality of pixels as taken along line 2-2 of FIG. 1 according to some implementations of the display 100. Each pixel 110 includes at least one pixel element 202. Depending on the type of the display 100, the pixel element 202 may include various materials, substances, and/or structures to change the appearance of the pixel 110 from a first state to a second state. For instance, in the case that the display 100 is an LCD display, the pixel element 202 may include at least one liquid crystal element. Alternatively, in the case that the display is an electrophoretic display, the pixel element 202 may include an electrophoretic fluid and a plurality of electrically charged particles of at least one color. Accordingly, the actual structure or constitution of the pixel element 202 depends on the type of the display 100.

The display 100 may include a transparent outer protective layer 204 that enables light to pass from the pixels 110 to the exterior of the display 100. In the case of an unlit display, the light may pass through the protective layer 204 and be reflected back by the pixels 110. Alternatively, in the case of a backlit display or internally lit display, the light may pass through the pixels 110 and exit through the protective layer 204. The protective layer 204 may be any suitable type of transparent material such as glass, plastic or the like. Further, in some examples, the display may include one more color filters (not shown in FIG. 2) to provide one or more different colors to an otherwise monotone display.

Each light sensor 112 may receive light 206 associated with the corresponding pixel 110. For example, depending on the type of the display, the light 206 may pass through the pixel element 202, may be reflected from the rear of the pixel 110, or the like. Accordingly, the location of the light sensor 112 relative to the corresponding pixel element 202 may be dependent at least in part on the type of the display 100. Various examples are discussed additionally below and thus implementations herein are not limited to any particular location for the light sensors 112 or any particular type of display 100.

As a result of receiving or sensing the light 206 associated with the corresponding pixel 110, each light sensor 112 may provide feedback or sensor output 208, such as in the form of an electrical signal, to an image processing module 210. Accordingly, the image processing module 210 may receive the sensor output 208 from each light sensor 112 to determine an actual optical state of the corresponding pixel 110. Based at least in part on the sensor output 208 received from the respective light sensor 112 associated with a particular pixel 110, the image processing module 210 may select or specify a subsequent pixel control signal to be applied to update the particular pixel 110. This may enable the image processing module 210 to more accurately control the colors produced by each pixel in the display 100. Further, as noted above, "colors" as used herein may include black, white, varying shades of gray and other monotone variations in addition to, or as an alternative to, the colors of the visible spectrum, such as red, yellow, blue and combinations thereof.

The pixels 110 may be arranged in rows and columns aligned in a generally planar configuration in a pixel element layer 212. For example, the pixel element layer 212 may generally have a thickness based at least in part on an overall thickness of a single pixel 110. In the illustrated example of FIG. 2, the light sensors 112 are positioned proximate to respective pixels 110 under or below the pixel element layer 212, i.e., on a side of the pixel element layer 212 that is opposite to an outer surface 214 of the display viewable by a user. Thus, each light sensor is in sufficient proximity to its associated pixel to be able to sense the optical state of that pixel without being significantly affected by the optical states of other pixels. In some examples, the sensed optical state may be the current tone, shade, luminance or other color of the pixel.

Further, in other examples, the light sensors 112 may be positioned proximate to the respective pixels 110 within the pixel element layer 212, or may be positioned proximate to the respective pixels 110 above the pixel element layer 212. In still other examples, the light sensors 112 may positioned proximate to the respective pixels by being positioned at least partially within one or more of the pixel elements 202 of the respective pixels 110.

Figure 3:
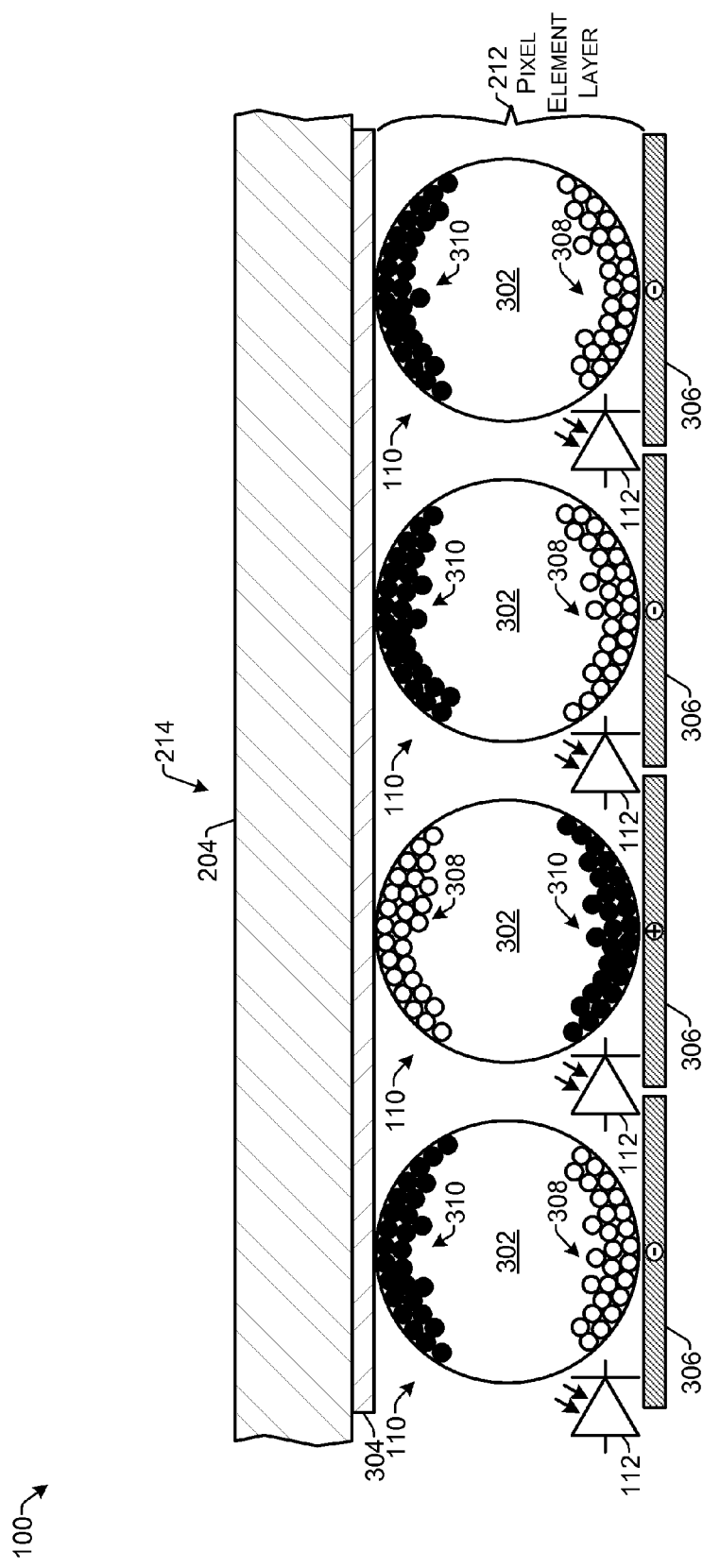
FIG. 3 illustrates an example cross section of a plurality of pixels according to some implementations of the display.

FIG. 3 illustrates an example cross sectional view of a plurality of pixels according to some implementations of the display 100. In this example, each pixel 110 includes a microcapsule 302 as a pixel element. The microcapsules 302 are located between a top transparent electrode 304 and one or more bottom electrodes 306. The top transparent electrode 304 may be a thin layer of transparent conductive material, such as indium tin oxide, that does not obscure the ability to see the microcapsules 302 through the protective layer 204. In some cases, the top electrode may serve as a common electrode for a plurality of pixels 110.

In some embodiments, the microcapsules 302 may be electrophoretic microcapsules that are included in an electrophoretic display or other suitable type of display. As one example, the microcapsules 302 may contain a clear fluid, such as a liquid polymer or an oil, that has suspended therein a plurality of charged white particles 308 and a plurality of oppositely charged black particles 310. For example, the white particles 308 may be positively charged and the black particles 310 may be negatively charged, or vice versa. In yet other embodiments, the microcapsules 302 may include colored particles of a first polarity and different colored particles of an opposite polarity. In still other examples, the microcapsules may contain a colored fluid and only a single color of charged particles having either a negative or a positive charge, and a color that is different from the colored fluid.

The bottom electrodes 306 are located below the microcapsules 302, and each bottom electrode 306 may be individually addressed, such as by the image processing module 210 discussed above, either directly, or through a display controller. For instance, the lower electrodes 306 may receive a signal applied by the display controller to drive the microcapsules 302 to a next desired optical state. Thus, the display controller may individually control specific pixels 110 by applying a voltage to corresponding specific bottom electrodes 306.

In some examples, the bottom electrodes 306 may be arranged in a grid pattern and the pixel element microcapsules 302 may be distributed across the bottom electrodes 306 in the pixel element layer 212. In some implementations, the locations of the microcapsules 302 may not necessarily match the distribution of the electrodes 306 in the grid on a one-to-one basis. For instance, a particular microcapsule 302 may span two or more electrodes 306, such that if a first electrode 306 is positively charged and a second electrode 306 is negatively charged, a first portion of the microcapsule 302 over the first electrode 306 may be a first color and a second portion of the microcapsule over the second electrode may be a second color. Thus, in some cases, the pixels 110 are defined and addressed according to the electrodes 306, rather than the individual microcapsules 302 that may serve as pixel elements in each pixel 110. For example, a separate light sensor 112 may be associated with each pixel by associating a separate light sensor 112 with each separately addressable bottom electrode 306.

As illustrated in the example of FIG. 3, applying a negative charge to an electrode 306 repels the negatively charged particles (e.g., black particles 310) to the top of microcapsule 302, moving the positively charged particles (e.g., the white particles 308) to the bottom and thereby imparting a black appearance to the pixel 110. Reversing the voltage has the opposite effect, i.e., the positively charged white particles 308 are moved to the top of the microcapsule 302, imparting a white appearance to the pixel 110. Further, in some examples (not shown in FIG. 3) multiple bottom electrodes 306 may be provided for each pixel, which may enable the microcapsules 302 to be driven to various intermediate states to provide varying shades of gray. For example, when two electrodes 306 are independently addressable for each pixel 110, placing a positive charge on a first bottom electrode 306 and a negative charge on a second bottom electrode 306 can result in a shade of gray for the pixel. The amount of each charge can vary the shade or color, i.e., the luminance of the pixel 110.

The amount that the pixel's luminance changes may depend on both the amount of the voltage and a length of time over which the voltage is applied, with zero voltage leaving the pixel's luminance unchanged. For example, applying a higher voltage, applying a voltage for a longer period of time and/or applying a voltage more frequently results in a larger change in the luminance of the pixel 110. In some examples, such as in the case of an ePaper display, the pixels 110 may be controlled by applying a sequence of voltages to a pixel, instead of just a single value as in a typical LCD. These sequences of voltages may be referred to as "waveforms," and may be employed to prevent overcharging, prevent damage to the pixels 110, and so forth. Further, in some examples, the control signals used to drive a pixel 110 depend not only on the optical state to which the pixel 110 is being driven, but also on the optical state from which the pixel 110 is being driven. Depending on the display technology, other issues may also need to be taken into consideration when choosing a waveform to drive a pixel 110 to a desired color. Such issues may include the temperature of the display 100, the optical state of the pixel 110 prior to the current optical state, and the amount of time that has passed since the pixel 110 last had a voltage applied to it. Failure to properly control the signals applied for changing the pixels 110 from one optical state to a next can cause faint remnants of previous images to remain visible to a user (referred to as "ghosting"). Thus, some types of displays, such as electrophoretic displays, bi-stable displays, ePaper displays, and the like may accumulate memory effects over time due to applied pixel control signals, which may result in the pixels being in an unknown optical state. These memory effects may manifest as ghost images, inaccurately reproduced images, and so forth.

As illustrated in FIG. 3, a light sensor 112 may be associated with each pixel 110 to sense light associated with the pixel 110. For example, the light may pass through the pixel 110, may be reflected from the pixel 110, or a combination thereof. In this example, the light sensors 112 are illustrated as photodiodes, but any suitable type of light sensor 112 may be employed in this example or in the other implementations described herein, as discussed above. The light sensors 112 receive light from the adjacent corresponding pixel 110 to detect an indication of the current optical state of the pixel 110. For example, the light sensor 112 may be positioned in a location such that the light sensor can detect the current color of the pixel element 302. In the illustrated example, the light sensors 112 are shown as being located laterally adjacent to the corresponding pixel element 302. However, in other examples, the light sensors 112 may be located at any suitable location relative to the corresponding pixel element 302 or pixel 110, such as below, above, on, or within the pixel element layer 212. For example, the light sensors 112 may be located in, above, or below the transparent upper electrode 304, in, above or below a thin film transistor (TFT) layer (not shown in FIG. 3) below the pixel element layer 212, and so forth.

Each light sensor 112 may receive the light from its corresponding pixel element 302 and may provide a sensor output, such as to the image processing module 210 discussed above with respect to FIG. 2. The image processing module 210 may receive the sensor output and may determine a current optical state of the corresponding pixel 110 based at least in part on the sensor output. The image processing module 210 may further take into consideration other information when determining the current optical state of the pixel 110, which may include, for example, a pixel history that indicates what the current state of the pixel should be, a current temperature of the display, a record of waveforms or signals that have been recently applied to the pixel, and so forth. The image processing module 210 may then use this information to produce an accurate image on the display 100. As one example, the image processing module 210 may modify a waveform to be applied to the particular pixel for driving the pixel to a desired optical state, or may select a different waveform from that which would have been selected without access to the sensor output. Thus, the sensor feedback information received from each light sensor 112 may enable the image processing module 210 to avoid undershooting or overshooting a desired optical state for each pixel and thereby can avoid ghosting effects and other undesirable artifacts on the display 100.

Figure 4:
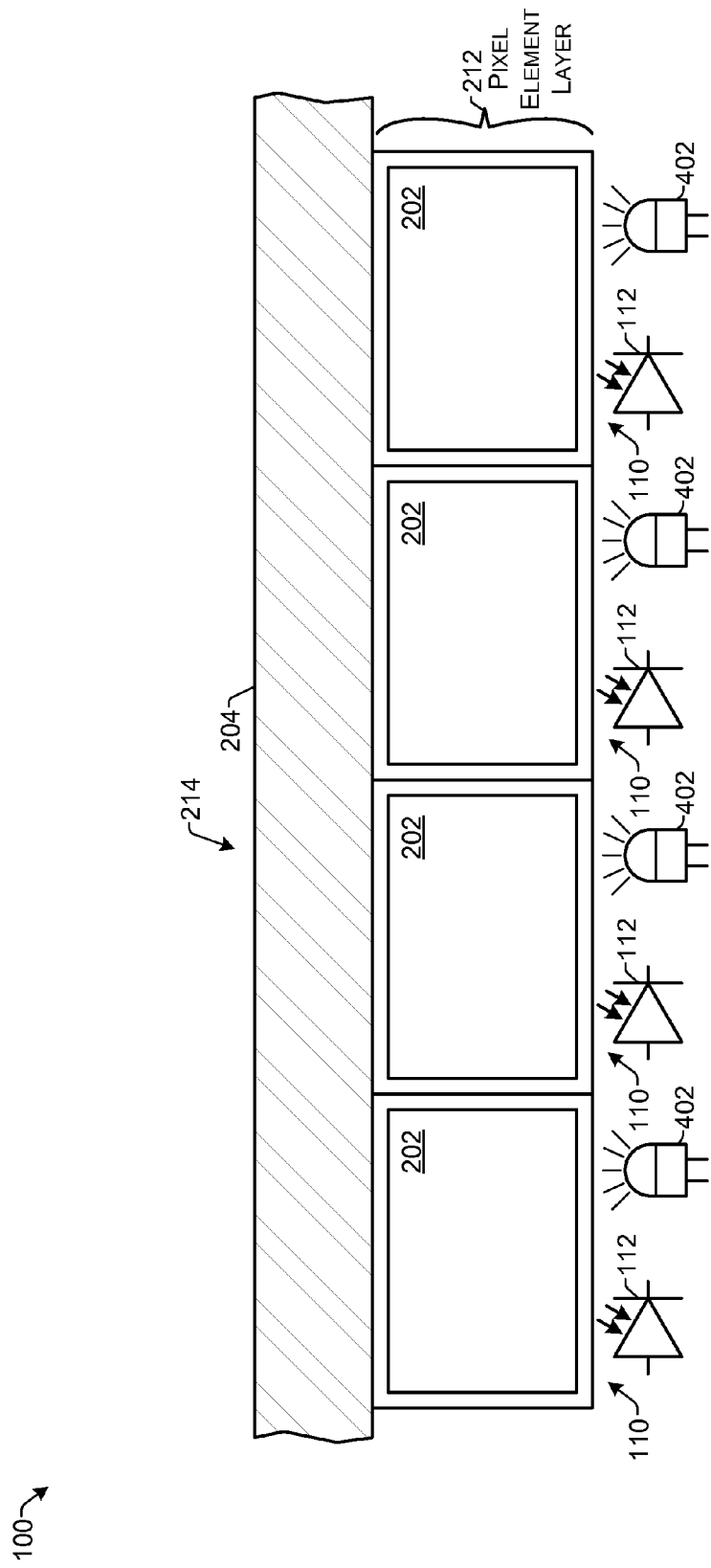
FIG. 4 illustrates an example cross section of a plurality of pixels according to some implementations of the display.

FIG. 4 illustrates an example cross sectional view of a plurality of pixels according to some implementations of the display 100. In this example, the light sensors 112 are illustrated as photodiodes, but any suitable type of light sensor may be employed in this example or in the other implementations described herein, as discussed above. In the illustrated example, the light sensors 112 are shown as being located below the corresponding pixel element 202. However, in other examples, the light sensors 112 may be located at any suitable location relative to the corresponding pixel element, such as laterally adjacent to, above, on, or within the pixel element 202. Further, in the case that there are multiple pixel elements 202 in each pixel 110, in some examples there may be a light sensor 112 for each pixel element 202, while in other examples, there may be a single light sensor 112 for the multiple pixel elements 202.

The example of FIG. 4 further includes a plurality of light sources 402 such as light emitting diodes (LEDs), or other suitable light sources. For instance, depending on the type of the display 100, the light sensors 112 may not receive sufficient light through the display 100 to accurately detect a current optical state of the corresponding pixel element 202. Additionally, or alternatively, in other types of displays 100, the ambient light surrounding the display may be subject to variations. For example, a portion of the display 100 may be in a shadow cast externally onto the display, while another portion of the display 100 may be in direct sunlight, which can result in the output from the light sensors 112 not being uniform with one another. Such a situation may skew the subsequent output of the image processing module 210 when controlling the pixels 110 of the display 100. Accordingly, the light sources 402 may be used to normalize the readings of the light sensors 112. As one example, the light sources 402 may be flashed briefly to obtain a reading from the light sensors 112 for each pixel 110.

The illumination provided by the light sources 402 may provide a consistent level of light that can enable consistent and accurate reading of the optical state of each pixel for determining a value to assign to each pixel based on the sensed reflected light. For example, amount of reflected light sensed at each respective light sensor may be determined and quantitized as a value that corresponds to a current optical state of the associated pixel. The respective value determined for the output of each light sensor may more accurately represent the optical state of each respective pixel and changes in the optical state of each respective pixel if the light level is consistent, such as by using light sources 402 to illuminate the pixels at a consistent level. As another example, when measuring light reflected from a pixel, the difference between the light detected during illumination by a light source 402 and the light detected when the light source 402 is not active may be used to counteract effects of any light leakage from the environment external to the display.

Alternatively, in the case of a backlit display, the light sources 402 may also serve as the backlights for the display 100 and may provide a generally constant light. As another alternative, rather than having a light source corresponding to each of the pixels 110, a single light source 402 may be provided for multiple pixels 110, such as, for example, by providing one light source 402 at a junction of four pixels, or the like. Further, in some cases, rather than using visible light, infrared (IR) light or other suitable wavelength of electromagnetic energy may be used for the light sources 402 and the light sensors 112. For example, illumination of pixels using an IR light source 402 may be undetectable to a user. Differences in reflected IR light may be detected by a properly configured light sensor 112, with the detected differences indicating a current color of an associated pixel 110 corresponding to each respective light sensor.

As another alternative, rather than providing a plurality of separate light sources 402, some types of light sensors 112 may also serve as light sources 402. For example, in the case that the light sensors 112 are photodiodes, alternating light sensors 112 may be operated in an LED mode, while adjacent photodiodes may sense the reflected light. Thus, a first set of light sensors 112 may sense light reflected from their associated pixels as a result of neighboring light sensors 112 producing light in an LED mode, and then subsequently the first set of light sensors 112 may be operated in an LED mode, while the second set of light sensors 112 are operated as photodiodes in a light sensing mode.

As yet another alternative, in addition to or in place of using the light sources 402, one or more pixels having a known property may be used as a reference to normalize light sensor outputs for the other pixels in the display 100. For example, one or more pixels located underneath the bezel 106 (as discussed above with respect to FIG. 1) of the display 100, or in an inconspicuous location, such as a corner of the display 100, may be maintained in a constant optical state, and may thereby be used as a reference to normalize the light sensor outputs for the other pixels in the display 100.

Figure 5:
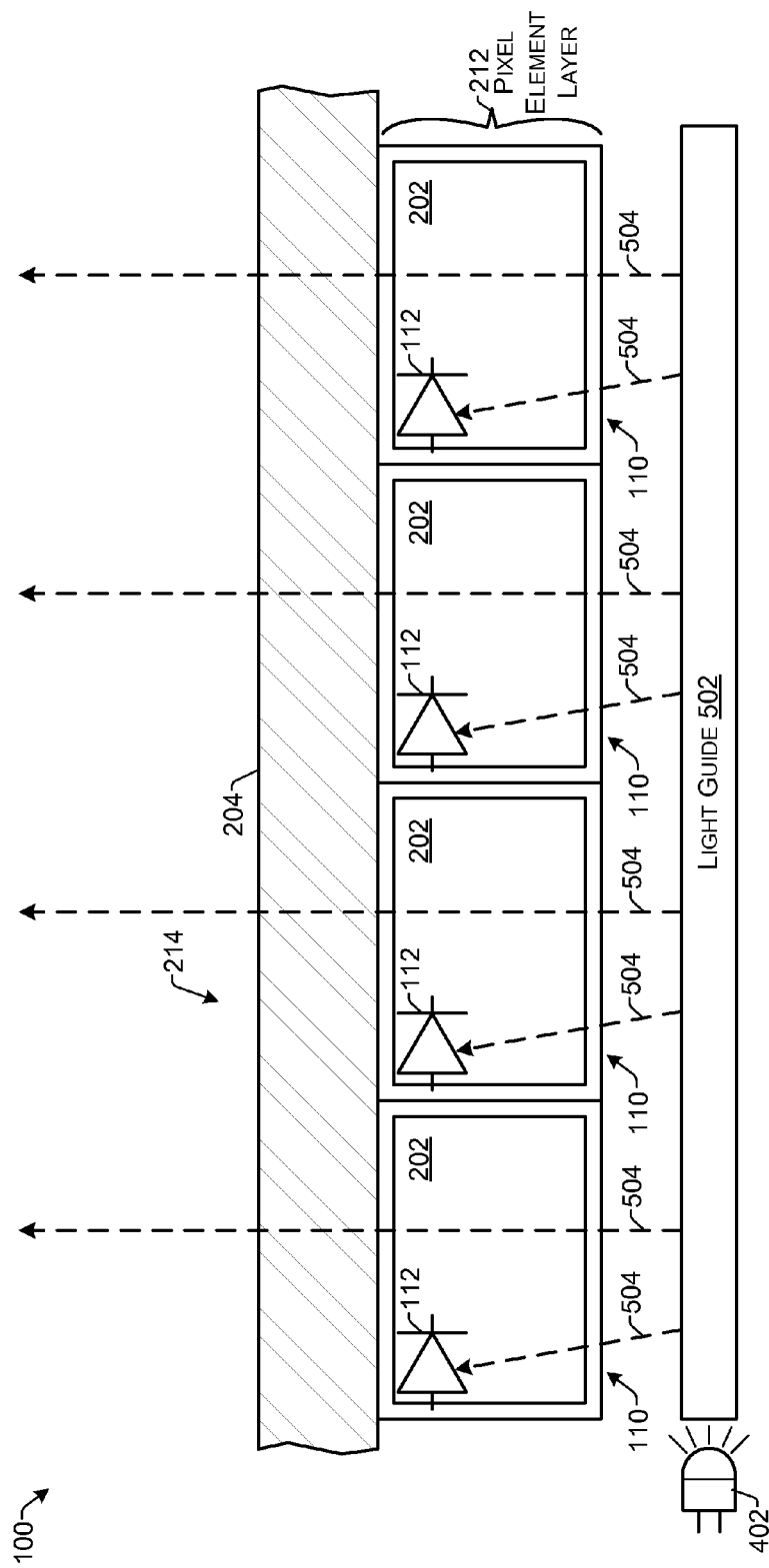
FIG. 5 illustrates an example cross section of a plurality of pixels according to some implementations of the display.

FIG. 5 illustrates an example cross sectional view of a plurality of pixels according to some implementations of the display 100. In this example, the light sensors 112 are illustrated as photodiodes, but any suitable type of light sensor may be employed in this example or in the other implementations described herein, as discussed above. In the illustrated example, the light sensors 112 are shown as being located at least partially inside the corresponding pixel element 202. However, in other examples, the light sensors 112 may be located at any suitable location relative to the corresponding pixel element, such as below, above, on, or laterally adjacent to the pixel element 202.

FIG. 5 illustrates an example of a backlit display 100 that includes an edge illuminated light guide 502. One or more light sources 402 may emit light into the light guide 502. The light from the light source(s) 402 is diffused and reflected within the light guide 502 to exit as light rays 504 in a direction toward the pixels 110 and the light sensors 112. Thus, the light rays 504 passing through the pixel elements 202 may be received by the light sensors 112 to provide an indication of the current optical state of the corresponding pixel element 202. Furthermore, the light provided by the light guide 502 may impart a normalcy of illumination to the pixels 110, which may counteract effects of variations in ambient lighting, shadows on the display, or the like.

Figure 6A:
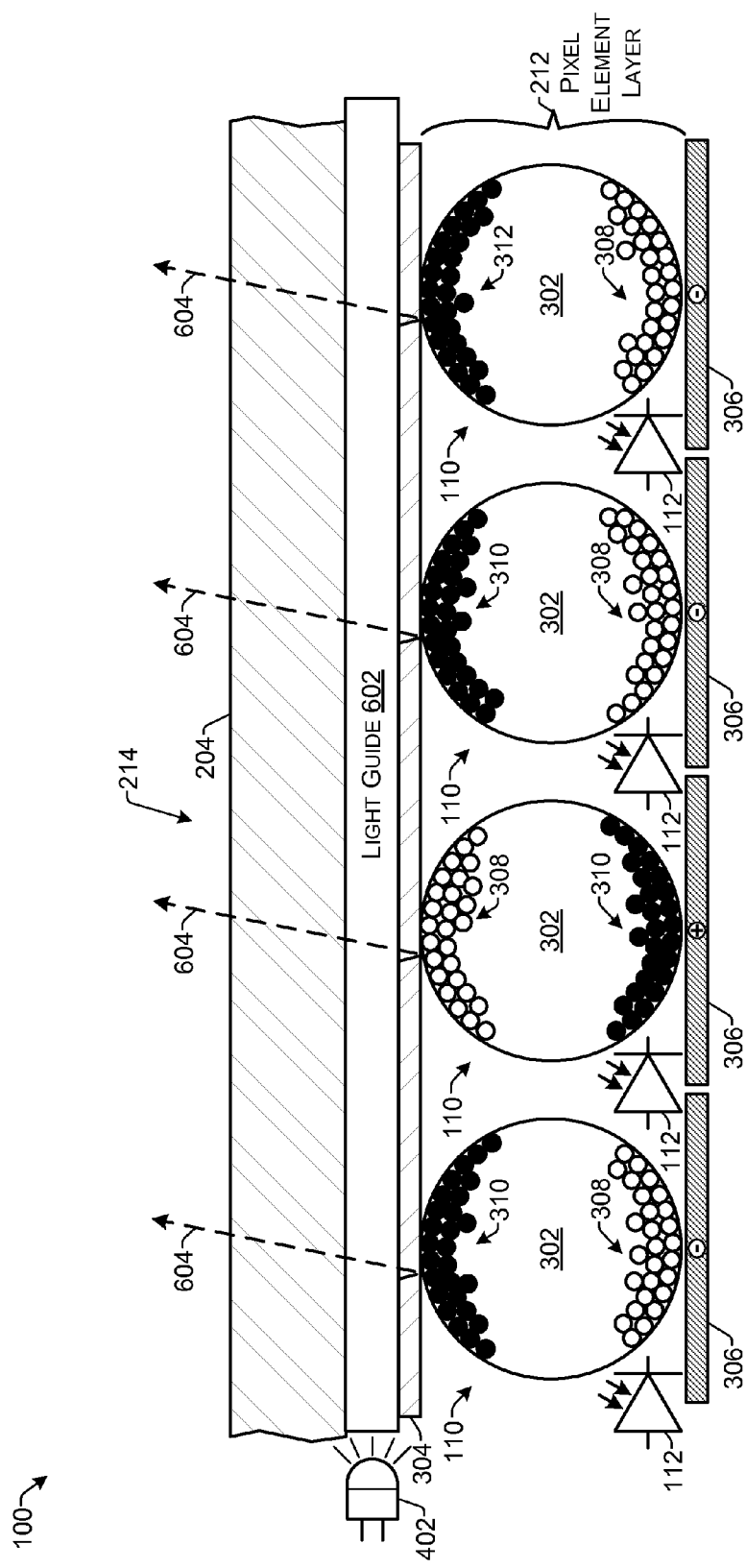
FIG. 6A illustrates an example cross section of a plurality of pixels according to some implementations of the display.

FIG. 6A illustrates an example cross sectional view of a plurality of pixels according to some implementations of the display 100. In this example, the light sensors 112 are illustrated as photodiodes, but any suitable type of light sensor may be employed in this example or in the other implementations described herein, as discussed above. In the illustrated example, the light sensors 112 are shown as being located adjacent to the corresponding pixel element 302. However, in other examples, the light sensors 112 may be located at any suitable location relative to the corresponding pixel element 302, such as below, above, on, or within the pixel element 302.

In the example of FIG. 6A, a light guide 602 is positioned as a front light in front of the pixels 110 and the upper transparent electrode 304 and under the protective layer 204. Light entering the light guide 602 from one or more light sources 402 is diffused and reflected within the light guide toward the pixels 110 as light rays 604, which are reflected from the pixels 110 back through the light guide 602 and through the protective layer 204. The light sensors 112 may detect light from the pixels 110 and may provide a sensor output to the display control module, as described above, such as based on the amount of light detected, to provide an indication of the current state of each pixel 110. Furthermore, the front light provided by the light guide 602 may impart a normalcy of illumination to the pixels 110, which may counteract effects of variations in ambient lighting, shadows on the display, or the like.

Figure 6B:
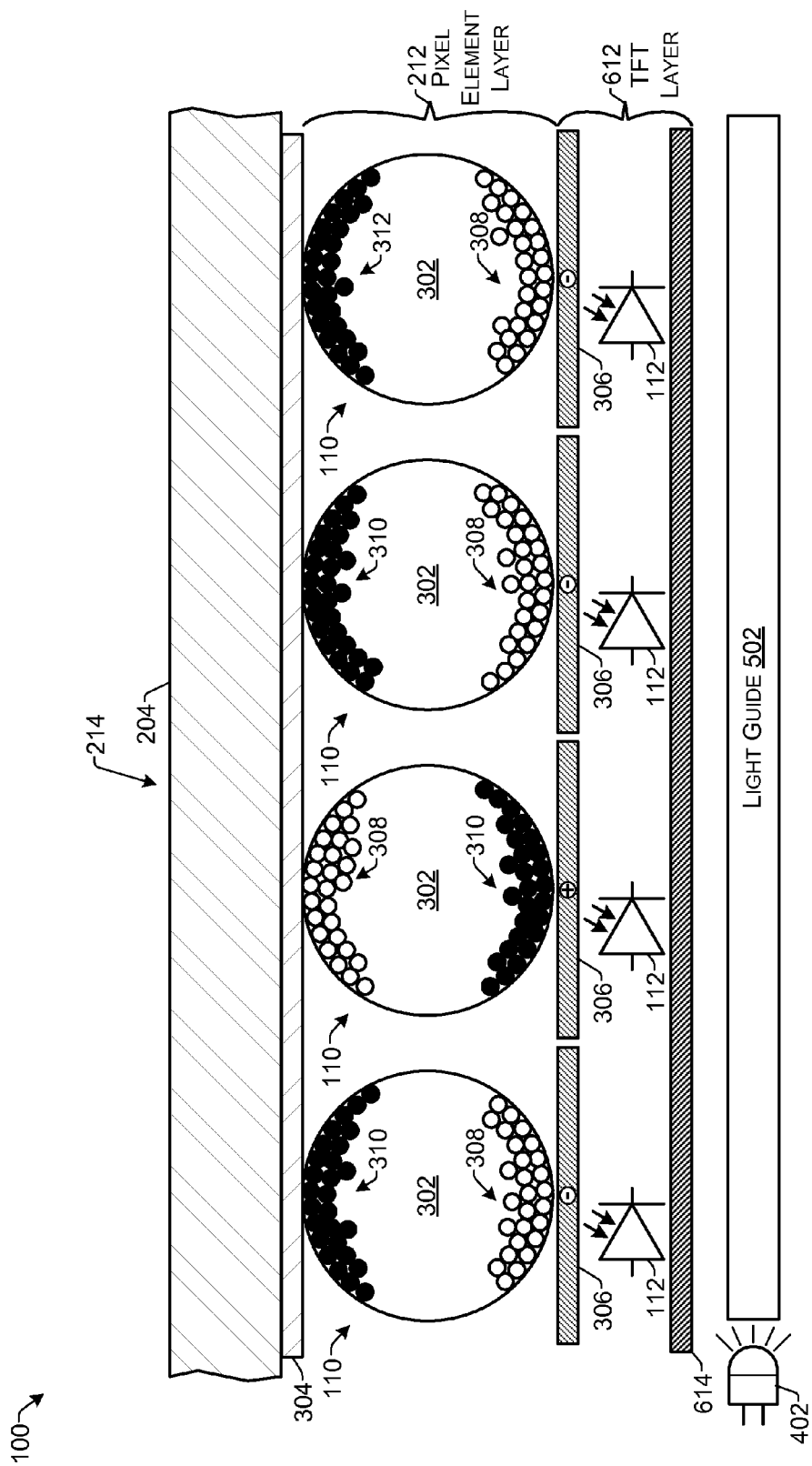
FIG. 6B illustrates an example cross section of a plurality of pixels according to some implementations of the display.

FIG. 6B illustrates an example cross sectional view of a plurality of pixels according to some implementations of the display 100. In this example, the light sensors 112 are illustrated as photodiodes, but any suitable type of light sensor may be employed in this example or in the other implementations described herein, as discussed above. In the illustrated example, a thin film transistor (TFT) layer 612 is shown having the light sensors 112 located in the TFT layer 612. However, in other examples, the light sensors 112 may be located at any suitable location relative to the corresponding pixels 110, such as below, above or on the TFT layer. The TFT layer 612 may include a substrate 614, a plurality of light sensors 112 and a plurality of electrodes, which may include the bottom electrodes 306 discussed above. Various other components (not shown in FIG. 6B) may be included in the TFT layer, as is known, depending on the particular type and configuration of the display 100. The electrodes 306 and other components of the TFT layer 612 may be sufficiently translucent or transparent to permit light from the pixels 110 to be sensed by the light sensors 112.

Additionally, the light guide 502 may positioned as a backlight underneath the TFT layer 612 in some implementations. The light from the light source(s) 402 is diffused and reflected within the light guide 502 to exit in a direction toward the pixels 110. Thus, the light provided by the light guide 502 may impart a consistent level of illumination to the pixels 110, which may counteract effects of variations in ambient lighting, shadows on the display, or the like. Various other techniques discussed herein may be used in place of, or in addition to, the light guide 502, such as providing multiple light sources 402, operating alternating light sensors 112 in LED mode, and so forth.

Figure 7:
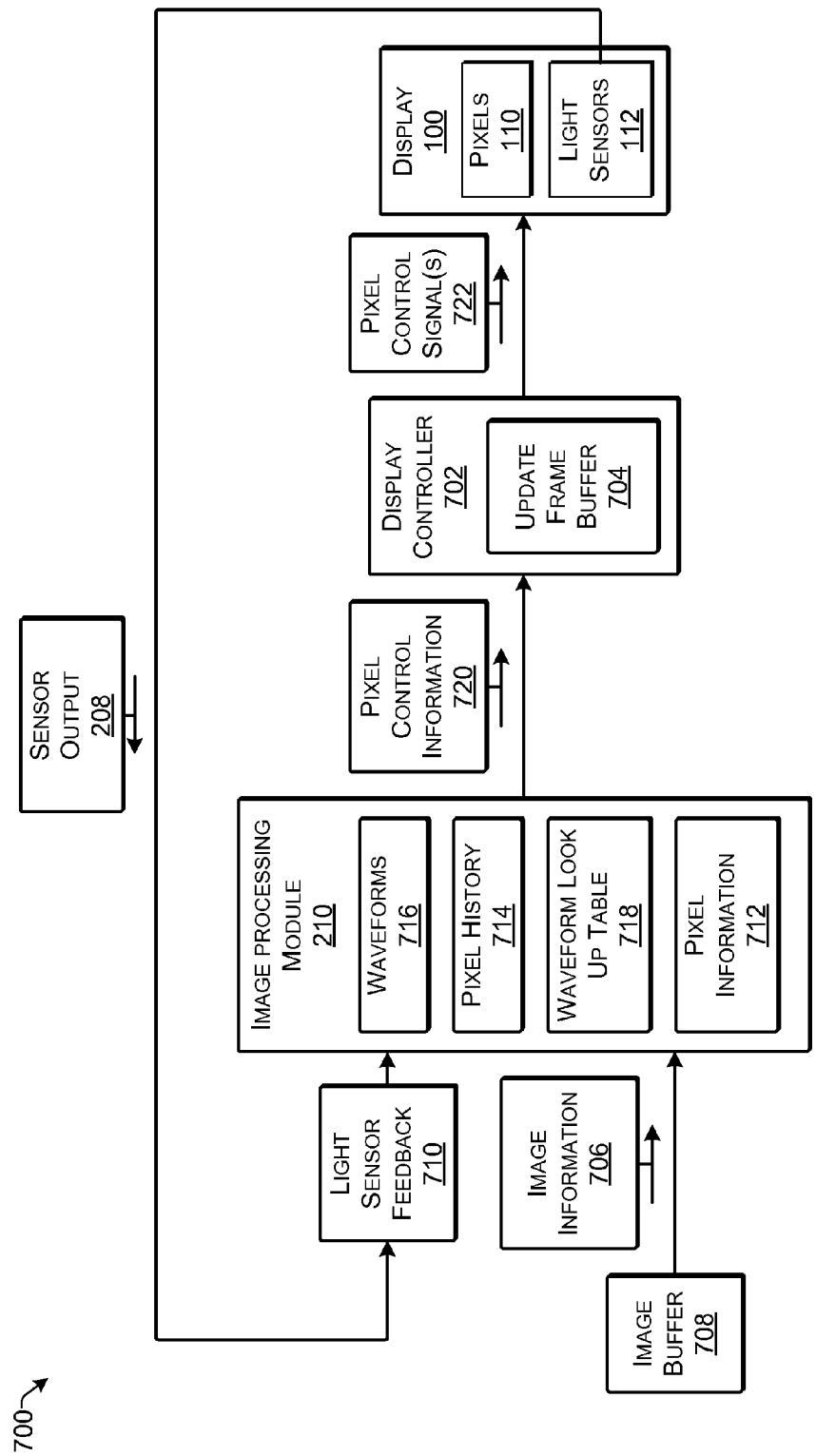
FIG. 7 illustrates an example display control framework according to some implementations.

FIG. 7 illustrates an example framework 700 for utilizing light sensor output as feedback for controlling the display 100 according to some implementations. In some examples, an image processing module 210 for driving the display 100 may determine a pixel control signal to be applied to one or more pixels of the display 100 to be used update the corresponding pixels to produce a desired image. In some examples, such as in the case of an electrophoretic or other bi-stable display, the pixel control signal may be a waveform to move the pixel from a first optical state corresponding to a current image to a second optical state corresponding to a next desired image. Thus, the waveform may be selected based on the desired second optical state, the pixel history (i.e., the current state and earlier states of the pixel), the display temperature, and the feedback provided by the light sensor output associated with that pixel. For example, when the optical state of a pixel is to be changed, the appropriate waveform is chosen based on at least some of the factors listed above, and the pixel's location in an update frame buffer is set to that waveform. As another variation, the image processing module 210 may encode some of the factors (such as a pixel's current optical state and the desired optical state) in a waveform index and then employ a waveform table when updating pixels based on the other factors, such as the light sensor output.

As illustrated in the example of FIG. 7, the image processing module 210 may be coupled to a display controller 702 that includes or accesses an update frame buffer 704. The image processing module 210 may be configured to determine how to present images on the display 100 based on the various factors discussed above. For example, the image processing module 210 may receive image information 706, such as from an image buffer 708, and may determine how each pixel needs to be controlled, while the display controller 702 may convert instructions received from the image processing module 210 into commands and corresponding electrical signals to drive the display 100.

In the example of FIG. 7, the image processing module 210 receives the sensor output 208 from the light sensors 112 as light sensor feedback 710. The image processing module 210 further receives the image information 706 for the next image to be presented on the display 100. Based at least in part on the image information 706, the image processing module 210 determines pixel information 712, which may include a desired next optical state of each pixel 110 in the display 100 for displaying the next image. The image processing module 210 may take into account the pixel information 712, the light sensor feedback 710, and a pixel history 714 to select a waveform 716 to be applied to each pixel 110 that will be updated to present the next image. As mentioned above, the pixel history 714 may include the intended current state of each pixel 110 in the display 102. Additionally, in some examples, the pixel history 714 may include one or more previous optical states of each pixel 110 in the display 100. The image processing module 210 may further take into consideration various other factors, such as a temperature of the display 100, an ambient light level, and so forth. In some examples, the image processing module 210 may determine the waveform 716 to be applied to each pixel 110 to be updated, such as by referring to, a waveform index, a waveform look up table 718, or the like. The image processing module 210 may then provide pixel control information 720 related to the selected waveforms to the display controller 702, which may apply respective pixel control signals 722, such as waveforms, to the corresponding pixels 110.

In some examples, the pixel control information 720 is set in the update frame buffer 704. The display controller 702 may include or may be coupled to the update frame buffer 704, which is configured to store pixel updates pending for presentation on the display 100. The display controller 720 receives the pixel updates in sequence for presentation on the display 100, with each pixel update being presented sequentially on the display. This arrangement may enable a high frequency refresh rate of the display 100 since the images from the image buffer 708 may be processed sequentially, as generated, and presented by the display.

Furthermore, the above example has been described in the context of an electrophoretic or other ePaper display that may employ waveforms for updating the optical state of the pixels in the display 100. However, implementations herein are not limited to any particular type of display and, accordingly, in other examples, waveforms may not be used. Rather, the image processing module 210 may use a different technique, based at least in part on the light sensor feedback 710, to determine the pixel control information 720 to be applied to control or set the optical states of the pixels to be updated. Thus, the pixel control signal 722 provided to the display 100 by the display controller 702 may be based at least in part on the light sensor output 208 received from the light sensors 112 associated with each pixel 110. Accordingly, the sensor output 208 from the light sensors 112 may assist the display control module 210 in determining and controlling the accuracy of the image presented on the display 100.

Figure 8:
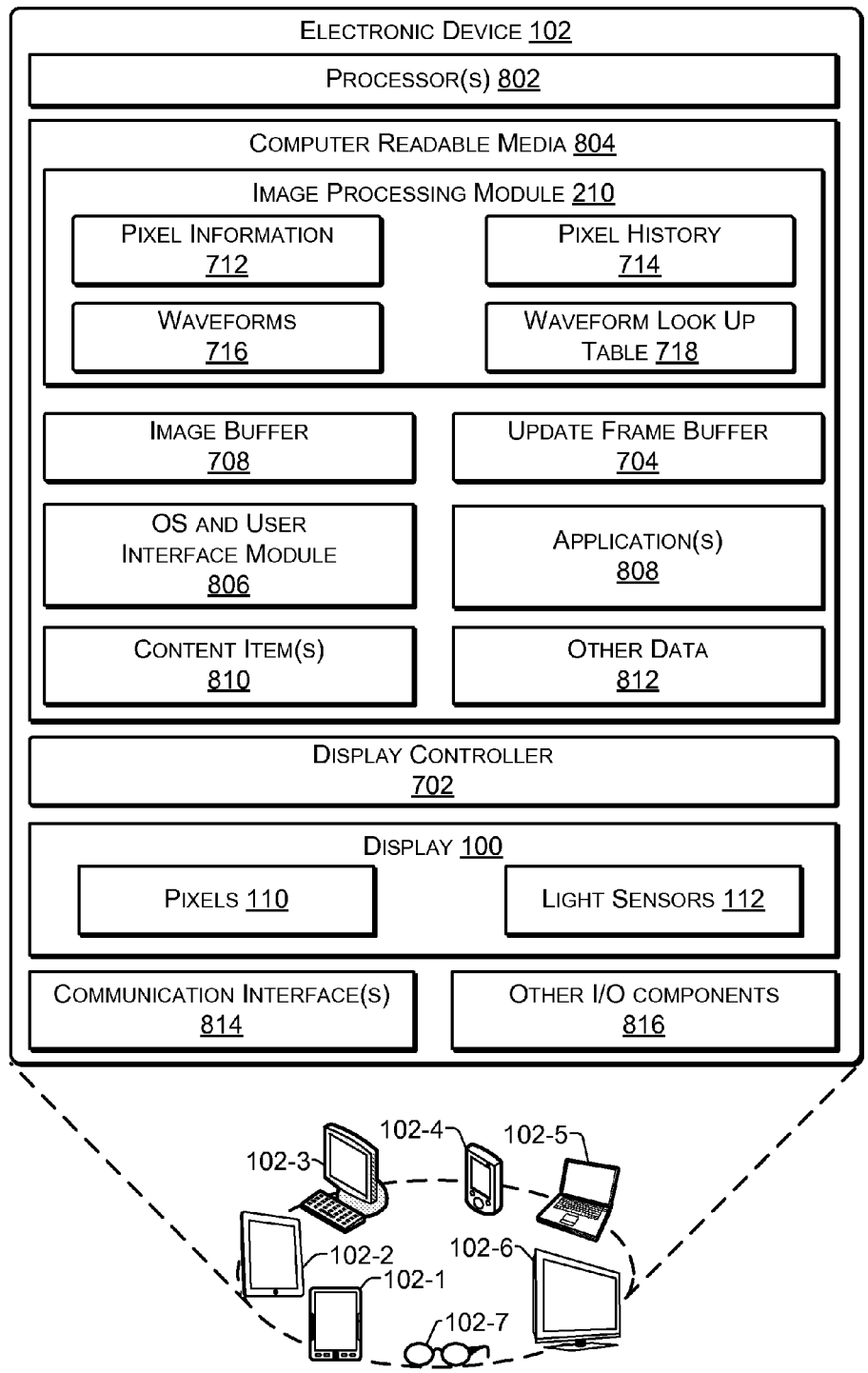
FIG. 8 illustrates select components of an example electronic device according to some implementations.

FIG. 8 illustrates select example components of the electronic device 102 that may be used to implement the functionality described above according to some implementations. The electronic device 102 may be implemented as any of a number of different types of electronic devices. Some examples of the electronic device 102 may include portable media player devices and electronic book (eBook) readers 102-1; tablet computing devices 102-2; desktop computing devices, terminal computing devices and workstation computing devices 102-3; smart phones, cellular phones, navigation devices and mobile devices 102-4; laptop and netbook computing devices 102-5; televisions, gaming systems, home electronic devices, appliances, tools, and automotive electronic devices 102-6; augmented reality devices, helmets, goggles or glasses 102-7; and any other device capable of providing information to a display according to the techniques described herein.

In a very basic configuration, the electronic device 102 includes, or accesses, components such as at least one control logic circuit, central processing unit, or processor 802 and one or more computer-readable media 804. Each processor 802 may itself comprise one or more processors or processing cores. For example, the processor(s) 802 may include one or more low power cores, one or more high power cores, one or more graphics processing units, and so forth.

Depending on the configuration of the electronic device 102, the computer-readable media 804 may be an example of tangible non-transitory computer storage media and may include volatile and nonvolatile memory and/or removable and non-removable media implemented in any type of technology for storage of information such as computer-readable instructions, data structures, program modules or other data. The computer-readable media 804 may include, but is not limited to, RAM, ROM, EEPROM, flash memory or other computer-readable media technology, CD-ROM, digital versatile disks (DVD) or other optical storage, magnetic cassettes, magnetic tape, solid-state storage and/or magnetic disk storage. Further, in some cases, the electronic device 102 may access external storage, such as RAID storage systems, storage arrays, network attached storage, storage area networks, cloud storage, or any other medium that can be used to store information and that can be accessed by the processor 802 directly or through another computing device or network. Accordingly, the computer-readable media 804 may be computer storage media able to store instructions, such as computer program code, modules or components that may be executed by the processor 802.

The computer-readable media 804 may be used to store and maintain any number of functional components that are executable by the processor 802. In some implementations, these functional components comprise instructions or programs that are executable by the processor 802 and that, when executed, implement operational logic for performing the actions attributed above to the electronic device 102. Functional components of the electronic device 102 stored in the computer-readable media 804 may include the image processing module 210, executable by the processor 802 for controlling and updating the display 100, as discussed above, such as for presenting images on the display 100. Optionally, additional functional components stored in the computer-readable media 804 may include an operating system and user interface module 806 for controlling and managing various functions of the electronic device 102, for generating the user interfaces, and for providing basic functionality. In some examples, the display control module 210 may be integrated into the operating system 806, or may be operable separately therefrom. Additional optional components may include one or more applications 808, that may be executed to cause the device 102 to perform various functions and uses, as well as programs, drivers, and so forth.

The computer readable media 804 may further include the image buffer 708 and the frame buffer 704. In some examples, these buffers may be dedicated high speed memory locations in the electronic device 102.

In addition, the computer-readable media 804 may also store data, data structures and the like, that are used by the functional components. For example, data stored by the computer-readable media 804, at least temporarily, may include the pixel information 712, the pixel history 714, the waveforms 716 and the waveform look up table 718. Other optional data may include one or more content items 810 that may be displayed on the display 100, and other data 812, such as device settings and data used by the functional components. Further, the electronic device 102 may include many other logical, programmatic and physical components, of which those described are merely examples that are related to the discussion herein. Further, while the figures illustrate the functional components and data of the electronic device 102 as being present on the electronic device 102 and executed by the processor(s) 802 on the electronic device 102, it is to be appreciated that these components and/or data may be distributed across different computing devices and locations in any manner.

In some examples, the electronic device 102 may further include a display controller 702 to apply the pixel control signals to the pixels in the display 100. In some cases, the display controller 702 may be a software module executed by the one or more processors 802, while in other examples, the display controller 102 may be implemented wholly or partially in hardware, such as by a separate processor, firmware, logic circuits, or the like.

FIG. 8 further illustrates the display 100, which may be passive, emissive or any other form of display. In some examples, the display may be part of the electronic device 102, while in other examples, the display 100 may be able to communicate with the electronic device 102, such as through a cable, wireless connection, or the like. In some types of electronic devices 102, the display 100 may be a touch-sensitive display configured with a touch sensor (not shown) to sense a touch input received from an input effecter, such as a finger of a user, a stylus, or the like. In other implementations, the display 100 may be non-touch sensitive. Accordingly, in addition to, or as an alternative to, a touch sensitive display, the electronic device 102 may include various external controls, buttons, or input devices, as discussed below.

In some examples, the display 100 uses electronic paper (ePaper) display technology, which is bi-stable, meaning that the display is capable of holding text or other rendered images even when very little or no power is supplied to the display. As mentioned above, some examples of suitable displays that may be used with the implementations described herein include bi-stable LCD displays, MEMS displays, such as Mirasol® displays, cholesteric displays, pigmented electrophoretic displays, electrofluidic pixel displays, electrowetting displays, photonic ink displays, and others. In other implementations, or for other types of devices, the display 100 may be an active display such as a liquid crystal display, a plasma display, a light emitting diode display, an organic light emitting diode display, and so forth. These displays may comprise drive electronics, such as a display drive matrix configured to affect individual pixels within the display 100. Additionally, in some implementations, the display 100 may be a 3D display capable of providing a 3D image. For example, the display 100 may produce a 3D image by providing alternating left-eye and right-eye images with or without the use of shuttering or filtering eyeglasses.

In some examples, the electronic device 102 may include one or more communication interfaces 814, which may support wired and/or wireless connection to various networks, such as cellular networks, radio, WiFi networks, short-range or near-field networks (e.g., Bluetooth®), infrared signals, local area networks, wide area networks, the Internet, and so forth. The communication interfaces 814 may further allow a user to access storage on another device, such as a remote computing device, a network attached storage device, cloud storage, or the like.

In some examples, the electronic device 102 may be equipped with various other input/output (I/O) components 816. Such I/O components 816 may include a touchscreen and various user controls (e.g., buttons, a joystick, a keyboard, a keypad, etc.), a haptic or tactile output device, connection ports, and so forth. For example, the operating system 806 of the electronic device 102 may include suitable drivers configured to accept input from a keypad, keyboard, or other user controls and devices included as the I/O components 816. For instance, the user controls may include page turning buttons, navigational keys, a power on/off button, selection keys, and so on. Additionally, the electronic device 102 may include various other components that are not shown, examples of which may include accelerometers, a compass, a pressure sensor, a microphone, an ambient light sensor, a GPS device, a proximity sensor, a gyroscope, a camera, removable storage, a power source, such as a battery and power control unit, a PC Card component, and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Figure 9:
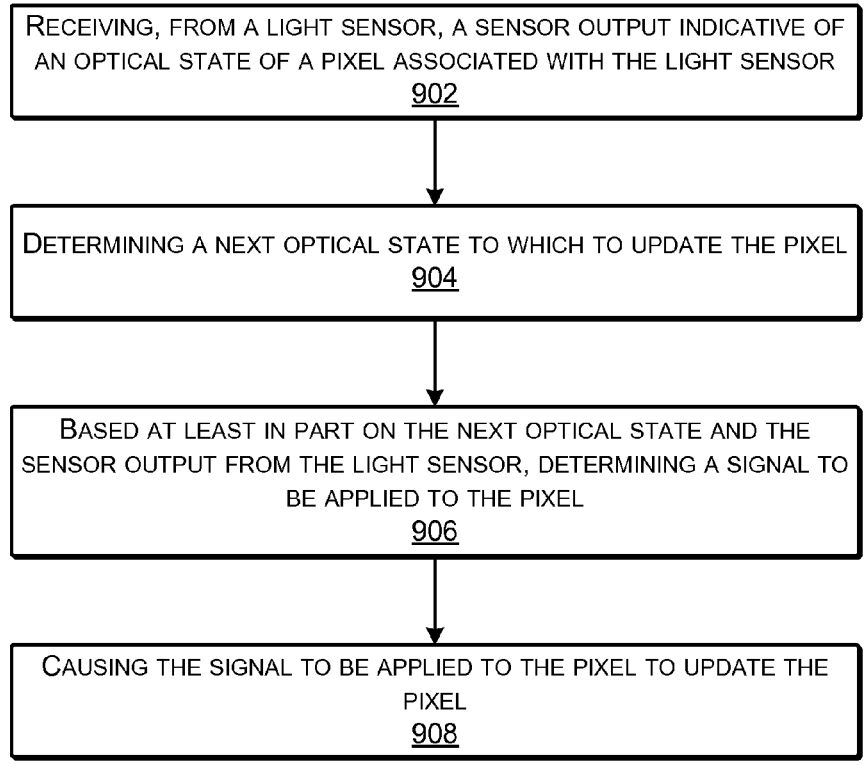
FIG. 9 is a flow diagram illustrating an example process for utilizing feedback from one or more light sensors according to some implementations.

FIG. 9 illustrates an example process for utilizing output from one or more light sensors to control a display according to some implementations. This process is illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the process is described with reference to the architectures, environments and frameworks described in the examples herein, although the process may be implemented in a wide variety of other architectures, environments or frameworks.

FIG. 9 is a flow diagram illustrating an example process 900 that may be executed, at least in part, by an image processing module for utilizing feedback from one or more light sensors associated with a display according to some implementations.

At 902, the image processing module receives, from a light sensor, a sensor output indicative of an optical state of a pixel associated with the light sensor. For example, the display may include a plurality of light sensors and each associated with a different pixel. The output from each light sensor may indicate the current optical state of the corresponding pixel with which the light sensor is associated.

At 904, the image processing module determines a next optical state to which to update the pixel. For example, the image processing module may receive image information that indicates a desired next optical state of the pixel, as well as that of other pixels in the display.

At 906, based at least in part on the next optical state and the sensor output from the light sensor, the image processing module determines a signal to be applied to the pixel. For example, in the case of a bi-stable display, the image processing module may determine an appropriate waveform for driving the pixel from the current optical state to the next optical state.

At 908, the image processing module causes the signal to be applied to the pixel to update the pixel to the next optical state. In some examples, the image processing module may store signal information to an update frame buffer. A display controller may use the information in the update frame buffer to apply a signal, such as a waveform to the pixel.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:
under control of one or more processors configured with executable instructions,
operating a first light sensor in a light emitting mode to illuminate at least one pixel of a plurality of pixels of a display having the plurality of pixels and a plurality of light sensors;
operating a second light sensor in a light sensor mode, the second light sensor proximate to the at least one pixel of the display having the plurality of pixels and the plurality of light sensors, the second light sensor receiving light emitted from the first light sensor;
receiving an output from the second light sensor;
determining signal information related to a pixel control signal for the pixel based at least in part on the output from the second light sensor; and
sending the signal information.

2. The method as recited in claim 1, wherein a respective light sensor of the plurality of light sensors is associated with the respective pixel of the plurality of the pixels.

3. The method as recited in claim 1, wherein:
a respective light sensor of the plurality of light sensors is associated with the respective pixel of the plurality of the pixels;
the determining the signal information includes determining signal information for respective pixel control signals for the plurality of pixels based at least in part on the respective output from the respective light sensor associated with the respective pixel of the plurality of pixels; and
the sending includes sending the signal information to cause sending of the respective pixel control signals to the corresponding pixels.

4. The method as recited in claim 1, wherein the display comprises an electrophoretic display and the pixel control signal comprises a waveform.

5. The method as recited in claim 1, wherein the sending the signal information includes sending the signal information to an update frame buffer, the method further comprising:
accessing the update frame buffer; and
sending the pixel control signal to the pixel based at least in part on the signal information.

6. The method as recited in claim 1, further comprising:
receiving sensor outputs from the plurality of light sensors; and
determining values corresponding to the sensor outputs based at least in part on a sensor output received from one of the light sensors associated with one of the pixels having a known optical state.

7. The method as recited in claim 1, further comprising:
receiving sensor outputs from the plurality of light sensors; and
determining respective values for the sensor outputs based at least in part on a difference determined between light detected with illumination of the plurality of pixels and light detected without the illumination of the plurality of pixels.

8. An electronic device comprising:
a display including a plurality of pixels and a plurality of light sensors;
one or more light generating sources disposed behind the display of the electronic device;
one or more processors;
one or more non-transitory computer-readable media; and
one or more modules maintained on the one or more non-transitory computer-readable media which, when executed by the one or more processors, cause the one or more processors to perform acts comprising:
operating a first light sensor in a light emitting mode to illuminate at least one pixel of the plurality of pixels of the display;
operating a second light sensor in a light sensor mode, the second light sensor proximate to the at least one pixel of the display having the plurality of pixels and the plurality of light sensors, the second light sensor receiving light emitted from the first light sensor;
receiving an output from the second light sensor;
determining signal information related to a pixel control signal for the pixel based at least in part on the output from the second light sensor; and
sending the signal information.

9. The electronic device as recited in claim 8, further comprising a display controller, the acts further comprising sending the signal information related to the signal to the display controller, wherein the display controller sends the signal to the pixel.

10. The electronic device as recited in claim 8, wherein the display is at least one of:
a bi-stable LCD display;
a micro-electromechanical system display;
a cholesteric display;
an electrophoretic display;
an electrofluidic pixel display;
an electrowetting display; or
a photonic ink display.

11. The electronic device as recited in claim 8, further comprising applying the signal information to the pixel.

12. The electronic device as recited in claim 11, wherein the determining the signal to be applied to the pixel is further based at least in part on a pixel history identifying one or more previous signals applied to the pixel.

13. A system comprising:
a display including:
a display screen having a plurality of pixels and a plurality of light sensors;
a first light sensor operating in a light emitting mode, the first light sensor being disposed in the display proximate to at least one pixel of the plurality of pixels to illuminate the at least one pixel of the plurality of pixels; and
a second light sensor operating in a light sensor mode, the second light sensor being disposed in the display proximate to the at least one pixel of the plurality of pixels of the display screen, the second light sensor being configured to receive light emitted from the first light sensor;
one or more processors in communication with the display; and
one or more non-transitory computer-readable media storing instructions executable by the one or more processors to:
determine signal information related to a pixel control signal for the at least one pixel based at least in part on output from the second light sensor; and
send the signal information.

14. The system as recited in claim 13, wherein:
the plurality of pixels include pixel elements arranged in a pixel element layer under an outer surface of the display; and
the plurality of light sensors are positioned under the pixel element layer.

15. The system as recited in claim 14, further comprising a thin film transistor layer under the pixel element layer, wherein the plurality of light sensors are positioned at least one of within or under the thin film transistor layer.

16. The system as recited in claim 13, wherein:
the plurality of pixels include pixel elements arranged in a pixel element layer under an outer surface of the display; and
the first light sensor and/or the second light sensor is positioned within the pixel element layer adjacent to the at least one pixel of the plurality of pixels associated with the first light sensor and/or the second light sensor.

17. The system as recited in claim 13, wherein:
the at least one pixel of the plurality of pixels includes at least one pixel element; and
the first light sensor and/or the second light sensor associated with the at least one pixel of the plurality of pixels is at least partially integrated into the at least one pixel element.

18. The system as recited in claim 13, wherein the at least one pixel of the plurality of pixels comprises at least one electrophoretic microcapsule.

19. The system as recited in claim 13, wherein the plurality of pixels include pixel elements arranged in a pixel element layer under an outer surface of the display, the display further comprising a light guide positioned above or below the pixel element layer to illuminate the plurality of pixels.

20. The system as recited in claim 13, wherein the one or more processors and the one or more non-transitory computer-readable media are included in an electronic device, and the display is separate from and connected to the electronic device via wired or wireless connection.

* * * * *